(12) United States Patent
Nomi et al.

(10) Patent No.: US 11,443,145 B2
(45) Date of Patent: Sep. 13, 2022

(54) DATA ANALYZING DEVICE AND DATA ANALYZING METHOD

(71) Applicant: Keyence Corporation, Osaka (JP)

(72) Inventors: Taiga Nomi, Osaka (JP); Yasunobu Umehara, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 673 days.

(21) Appl. No.: 16/507,062

(22) Filed: Jul. 10, 2019

(65) Prior Publication Data

US 2020/0050886 A1 Feb. 13, 2020

(30) Foreign Application Priority Data

Aug. 7, 2018 (JP) .............................. JP2018-148308

(51) Int. Cl.
*G06K 9/62* (2022.01)

(52) U.S. Cl.
CPC ........... *G06K 9/626* (2013.01); *G06K 9/6228* (2013.01); *G06K 9/6256* (2013.01)

(58) Field of Classification Search
CPC . G06T 7/90; G06T 2207/20081; G06V 10/56; G06V 20/52; G10H 7/02; G10H 1/0575; G06K 9/00
See application file for complete search history.

(56) References Cited

U.S. PATENT DOCUMENTS

| | | | | |
|---|---|---|---|---|
| 6,904,408 B1 * | 6/2005 | McCarthy | ............ | A61B 5/6815 705/2 |
| 7,430,485 B2 * | 9/2008 | Linsen | ............... | G01N 21/8422 702/81 |
| 7,949,568 B2 * | 5/2011 | Fano | ..................... | G06Q 20/203 705/28 |
| 8,009,864 B2 * | 8/2011 | Linaker | .................. | G06V 20/10 382/103 |
| 8,189,855 B2 * | 5/2012 | Opalach | ............... | G06Q 10/087 382/209 |
| 8,630,724 B2 * | 1/2014 | Hamann | ................ | G05B 17/02 700/12 |
| 8,755,511 B2 * | 6/2014 | Duva | ...................... | H04M 3/51 379/266.07 |
| 8,781,105 B1 * | 7/2014 | Duva | ...................... | H04M 3/51 379/309 |

(Continued)

OTHER PUBLICATIONS

U.S. Appl. No. 16/507,058, filed Jul. 10, 2019 (118 pages).

(Continued)

*Primary Examiner* — Yosef Kassa
(74) *Attorney, Agent, or Firm* — Kilyk & Bowersox, P.L.L.C.

(57) ABSTRACT

To enable effectively narrowing down features to be generated, thereby generating effective features at a high speed, in obtaining the features from a large volume of data. A fixed rule and an additional rule are stored in advance. The fixed rule specifies a rule of a calculation operation for generating a new feature. The additional rule specifies whether to perform a calculation operation for generating the new feature on a basis of meta-information, not depending on whether the fixed rule is applicable. An objective variable is predicted from plurality of features on the basis of the fixed rule and the additional rule.

14 Claims, 14 Drawing Sheets

(56) References Cited

U.S. PATENT DOCUMENTS 8,917,860 B2 * 12/2014 Duva .................. H04M 3/5175
379/266.07
10,129,211 B2 * 11/2018 Heath .................... G06Q 30/02

OTHER PUBLICATIONS

U.S. Appl. No. 16/507,063, filed Jul. 10, 2019 (112 pages).
U.S. Appl. No. 16/507,064, filed Jul. 10, 2019 (134 pages).
U.S. Appl. No. 16/507,066, filed Jul. 10, 2019 (133 pages).
Samorani, et al., "A Randomized Exhaustive Propositionalization Approach for Molecule Classification," Informs Journal on Computing, vol. 23, No. 3, Aug. 31, 2010 (27 pages).

* cited by examiner

FIG. 6

| MEASUREMENT TIME | ELAPSED TIME | SET PRESSURE | SET TEMPERATURE | YIELD OF SUBSTANCE A | YIELD OF SUBSTANCE B | RINPUT OF SUBSTANCE C | RATE OF STIRRING | DIFFERENCE IN COOLING TEMPERATURE | FLOW RATE OF COOLING WATER |
|---|---|---|---|---|---|---|---|---|---|
| 13:00 | 0 | 10 | 23 | 0.01 | 0.20 | 0.23 | 200 | +2 | 3 |
| 13:01 | 1 | 11 | 24 | 0.02 | 0.21 | 0.20 | 600 | −0.5 | 2 |
| 13:02 | 2 | 14 | 24 | 0.05 | 0.23 | 0.20 | 1000 | −0.2 | 1 |
| 13:03 | 3 | 15 | 52 | 0.02 | 0.21 | 0.20 | 1200 | −0.2 | 1 |
| 13:04 | 4 | 22 | 12 | 0.05 | 0.25 | 0.21 | 1200 | −0.2 | 2 |
| 13:05 | 5 | 32 | 44 | 0.02 | 0.24 | 0.21 | 1200 | +0.3 | 2 |
| 13:06 | 6 | 22 | 42 | 0.02 | 0.24 | 0 | 1200 | +0.3 | 2 |
| 13:07 | 7 | 10 | 44 | 0.03 | 0.23 | 0 | 1200 | +0.3 | 2 |

FIG. 9

LIST OF FEATURES TO BE GENERATED

| |
|---|
| MEASUREMENT TIME + MEASUREMENT TIME |
| MEASUREMENT TIME − MEASUREMENT TIME |
| MEASUREMENT TIME * MEASUREMENT TIME |
| MEASUREMENT TIME / MEASUREMENT TIME |
| SET TEMPERATURE + FLOW RATE OF COOLING WATER |
| SET TEMPERATURE − FLOW RATE OF COOLING WATER |
| SET TEMPERATURE * FLOW RATE OF COOLING WATER |
| SET TEMPERATURE / FLOW RATE OF COOLING WATER |
| SET PRESSURE + RATE OF STIRRING |
| SET PRESSURE − RATE OF STIRRING |
| SET PRESSURE * RATE OF STIRRING |
| SET PRESSURE / RATE OF STIRRING |
| ... |
| SET TEMPERATURE + YIELD OF SUBSTANCE A |
| SET TEMPERATURE − YIELD OF SUBSTANCE A |
| SET TEMPERATURE * YIELD OF SUBSTANCE A |
| SET TEMPERATURE / YIELD OF SUBSTANCE A |
| SUM(YIELD OF SUBSTANCE A) |
| AVG(YIELD OF SUBSTANCE A) |
| MAX(YIELD OF SUBSTANCE A) |
| MIN(YIELD OF SUBSTANCE A) |
| SUM(YIELD OF SUBSTANCE B) |
| AVG(YIELD OF SUBSTANCE B) |
| MAX(YIELD OF SUBSTANCE B) |
| MIN(YIELD OF SUBSTANCE B) |
| ... |

FIG. 10

BLACKLIST RULES

| RULE ID | RULE | TYPE OF META-INFORMATION |
|---------|------|--------------------------|
| B1 | A COMBINATION OF A FEATURE REPRESENTED BY A TIME STAMP AND A FEATURE REPRESENTED BY A TIME STAMP IS SUBJECTED TO NO CALCULATION OPERATION EXCEPT FOR SUBTRACTION. | UNIT SYSTEM INFORMATION |
| B2 | A FEATURE WITH A LOW DEGREE OF IMPORTANCE IS COMBINED ONLY WITH A FEATURE WITH A HIGH DEGREE OF IMPORTANCE. | IMPORTANCE DEGREE INFORMATION |
| B3 | A FEATURE WITH A LOW DEGREE OF IMPORTANCE IS NOT SUBJECTED TO AN ACCUMULATING PROCESS. | IMPORTANCE DEGREE INFORMATION |
| B4 | FEATURES HAVING DIFFERENT OPERATION NUMBERS ARE NOT COMBINED TOGETHER. | OPERATION NUMBER INFORMATION |
| B5 | A FEATURE WITH A LOW DEGREE OF IMPORTANCE AND BEING UNCONTROLLABLE IS NOT SUBJECTED TO A CALCULATION OPERATION. | CONTROLLABILITY AND IMPORTANCE DEGREE INFORMATION |

FIG. 11

LIST OF FEATURES TO BE GENERATED (APPLIED WITH THE BLACKLIST RULES)

| Feature | Blacklist | Feature | Blacklist |
|---|---|---|---|
| MEASUREMENT TIME + MEASUREMENT TIME | B1, B2, B5 | SET TEMPERATURE + YIELD OF SUBSTANCE A | B4 |
| MEASUREMENT TIME - MEASUREMENT TIME | B2, B5 | SET TEMPERATURE - YIELD OF SUBSTANCE A | B4 |
| MEASUREMENT TIME * MEASUREMENT TIME | B1, B2, B5 | SET TEMPERATURE * YIELD OF SUBSTANCE A | B4 |
| MEASUREMENT TIME / MEASUREMENT TIME | B1, B2, B5 | SET TEMPERATURE / YIELD OF SUBSTANCE A | B4 |
| SET TEMPERATURE + FLOW RATE OF COOLING WATER | B2 | SUM(YIELD OF SUBSTANCE A) | |
| SET TEMPERATURE - FLOW RATE OF COOLING WATER | B2 | AVG(YIELD OF SUBSTANCE A) | |
| SET TEMPERATURE * FLOW RATE OF COOLING WATER | B2 | MAX(YIELD OF SUBSTANCE A) | |
| SET TEMPERATURE / FLOW RATE OF COOLING WATER | B2 | MIN(YIELD OF SUBSTANCE A) | |
| SET PRESSURE + RATE OF STIRRING | B2 | SUM(YIELD OF SUBSTANCE B) | B3, B5 |
| SET PRESSURE - RATE OF STIRRING | B2 | AVG(YIELD OF SUBSTANCE B) | B3, B5 |
| SET PRESSURE * RATE OF STIRRING | B2 | MAX(YIELD OF SUBSTANCE B) | B3, B5 |
| SET PRESSURE / RATE OF STIRRING | B2 | MIN(YIELD OF SUBSTANCE B) | B3, B5 |
| ... | | ... | |

FIG. 12

WHITELIST RULES

| RULE ID | RULE | TYPE OF META-INFORMATION |
|---|---|---|
| W1 | UNIT[Pa] * UNIT[rpm] | UNIT SYSTEM INFORMATION |
| W2 | UNIT[m3/s] * UNIT[°C] | UNIT SYSTEM INFORMATION |
| W3 | log(UNIT[s]) | UNIT SYSTEM INFORMATION |
| W4 | 3√(UNIT[m3]) | UNIT SYSTEM INFORMATION |
| W5 | MEAN(DEGREE OF IMPORTANCE [HIGH]) | IMPORTANCE DEGREE INFORMATION |

FIG. 13

LIST OF FEATURES TO BE GENERATED (APPLIED WITH THE WHITELIST RULES)

| | | | |
|---|---|---|---|
| MEASUREMENT TIME + MEASUREMENT TIME | B1, B2, B5 | SET TEMPERATURE + YIELD OF SUBSTANCE A | B4 |
| MEASUREMENT TIME - MEASUREMENT TIME | B2, B5 | SET TEMPERATURE - YIELD OF SUBSTANCE A | B4 |
| MEASUREMENT TIME * MEASUREMENT TIME | B1, B2, B5 | SET TEMPERATURE * YIELD OF SUBSTANCE A | B4 |
| MEASUREMENT TIME / MEASUREMENT TIME | B1, B2, B5 | SET TEMPERATURE / YIELD OF SUBSTANCE A | B4 |
| SET TEMPERATURE + FLOW RATE OF COOLING WATER | B2 | SUM(YIELD OF SUBSTANCE A) | |
| SET TEMPERATURE - FLOW RATE OF COOLING WATER | B2 | AVG(YIELD OF SUBSTANCE A) | |
| SET TEMPERATURE * FLOW RATE OF COOLING WATER | B2, W1 | MAX(YIELD OF SUBSTANCE A) | |
| SET TEMPERATURE / FLOW RATE OF COOLING WATER | B2 | MIN(YIELD OF SUBSTANCE A) | |
| SET PRESSURE + RATE OF STIRRING | B2 | SUM(YIELD OF SUBSTANCE B) | B3, B5 |
| SET PRESSURE - RATE OF STIRRING | B2 | AVG(YIELD OF SUBSTANCE B) | B3, B5 |
| SET PRESSURE * RATE OF STIRRING | B2, W1 | MAX(YIELD OF SUBSTANCE B) | B3, B5 |
| SET PRESSURE / RATE OF STIRRING | B2 | MIN(YIELD OF SUBSTANCE B) | B3, B5 |
| log(ELAPSED TIME) | W3 (ADDED) | MEAN(YIELD OF SUBSTANCE A) | W5 (ADDED) |
| $3\sqrt{}$(YIELD OF SUBSTANCE A) | W4 (ADDED) | ... | |
| ... | | | |

FIG. 14

SELECTION FORCING RULE

| RULE ID | RULE | TYPE OF META-INFORMATION |
|---|---|---|
| S1 | CONTROLLABLE: ○ | CONTROLLABILITY INFORMATION |

FIG. 15

| RANKING | DEGREE OF IMPORTANCE | FEATURE | APPLIED RULE | PHYSICAL QUANTITY |
|---|---|---|---|---|
| 1 | | YIELD OF SUBSTANCE A | – | |
| 2 | 0.8 | DIFFERENCE IN COOLING WATER TEMPERATURE | – | |
| 3 | 0.3 | log(LAPSED TIME) | W3 | RATE OF CHEMICAL REACTION [s^0.5] |
| 4 | 0.2 | 3√(YIELD OF SUBSTANCE A) | W4 | REPRESENTATIVE LENGTH [m] |
| 5 | 0.19 | FLOW RATE OF COOLING WATER | S1 | |
| 6 | 0.18 | SET TEMPERATURE × FLOW RATE OF COOLING WATER | B2,W1 | QUANTITY OF HEAT [Cal/s] |
| 7 | 0.17 | SET PRESSURE + YIELD OF SUBSTANCE A | – | |
| 8 | 0.15 | INPUT OF SUBSTANCE C | S1 | |
| 9 | 0.14 | RATE OF STIRRING | S1 | |
| 10 | 0.13 | SET PRESSURE – YIELD OF SUBSTANCE A | – | |
| 129 | 0.02 | SET TEMPERATUR | S1 | |
| 223 | 0.01 | SET PRESSURE | S1 | |

DATA ANALYZING DEVICE AND DATA ANALYZING METHOD

CROSS-REFERENCE TO RELATED APPLICATIONS

The present application claims foreign priority based on Japanese Patent Application No. 2018-148308, filed Aug. 7, 2018, the contents of which is incorporated herein by reference.

BACKGROUND OF THE INVENTION

1. Field of the Invention

The present invention relates to a data analyzing device and a data analyzing method.

2. Description of Related Art

A technique for trying to acquire a useful unknown knowledge from a large volume of information, generally called "data mining", is conventionally known. A typical method of data mining involves a pre-processing step, a feature extracting step, a model learning step, and a post-processing step that are sequentially executed. In the pre-processing step, operations such as collecting data necessary for analysis, and removing unnecessary noise from the data and filling a missing item to improve the efficiency of the analysis are performed. These operations are collectively referred as "ETL (extract, transform, and load)". In the feature extracting step, a feature that exists in the original data is manipulated to generate a new feature more useful for the analysis. In the model learning step, data that is prepared in the pre-processing step and the feature extracting step is input to a machine learning algorithm to obtain an analysis result. In the post-processing step, the analysis result obtained in the model learning step is subjected to a process such as outputting it to an external device or generating a report based thereon.

To design an optimal feature, trial and error by an experienced analyst is necessary, resulting in taking a long time to analyze data. In response to this situation, a technique is disclosed in, for example, "A Randomized Exhaustive Propositionalization Approach for Molecule Classification" (INFORMS Journal on Computing, Vol. 23, No. 3 Published Aug. 31, 2010). This known technique performs automatic generation of a new feature from data.

The technique disclosed in such a literature involves comprehensively applying a preliminarily defined series of arithmetic operators, such as a plus (+) operator, a minus (−) operator, a multiplication (×) operator, and a division (÷) operator, to an original feature, thereby automatically generating a large amount of new features.

The technique as disclosed in the above-described literature produces an enormous amount of new features as a result of using a plurality of arithmetic operators in combination. This technique generates a large volume of features that are hard to understand due to performing every combination without consideration of meaning of each column of data.

In this situation, a method called "feature selection" is known as a technique for narrowing down the number of features while maintaining analysis accuracy. This method enables, for example, only features having high correlations with an objective variable to remain.

However, in a case of using data containing noise, a large volume of automatically generated features may accidentally include features having high correlations with an objective variable although these features have originally no relationship with the objective variable, in some cases. In addition, it takes time to generate a large volume of features as well as to select features from among the large volume of the generated features.

SUMMARY OF THE INVENTION

The present invention has been achieved in view of these circumstances, and an object of the present invention is to enable effectively narrowing down features to be generated, thereby generating effective features at a high speed, in obtaining the features from a large volume of data.

To achieve the above-described object, a first aspect of the invention provides a data analyzing device for analyzing analysis target data. The data analyzing device includes a data input unit, a display unit, a supplementary information adding unit, a rule storage unit, and a prediction model generating unit. The data input unit receives an input of analysis target data including a plurality of features and an objective variable. The display unit displays a list of the plurality of features input by the data input unit. The supplementary information adding unit adds supplementary information to each of the plurality of features in the list displayed by the display unit based on an input by a user. The rule storage unit stores a fixed rule and an additional rule. The fixed rule specifies a rule of a calculation operation for generating a new feature from the feature alone or a combination of the plurality of features. The additional rule specifies whether to perform a calculation operation for generating the new feature on a basis of the supplementary information added by the supplementary information adding unit, not depending on whether the fixed rule is applicable. The prediction model generating unit generates a prediction model for predicting the objective variable from the plurality of features, on a basis of the fixed rule and the additional rule stored in the rule storage unit.

In this structure, in response to input of the analysis target data, the plurality of features included in the analysis target data are listed on the display unit, and supplementary information is added to each of the plurality of features listed by a user. The supplementary information is generally called "meta-information" and may also be called "incidental information added to data", "information explaining an attribute of data", or the like.

After the supplementary information is added, the prediction model generating unit generates, on the basis of the fixed rule and the additional rule, a prediction model for predicting the objective variable from the plurality of features. The fixed rule allows generation of a new feature from the feature alone or a combination of the plurality of features by means of a calculation operation, such as addition, subtraction, multiplication, or division. Even if the fixed rule is applicable, the additional rule determines whether to perform the calculation operation for generating a new feature on the basis of the supplementary information. That is, the supplementary information that is input by the user is reflected in determination whether to generate a new feature, thereby effectively narrowing down the features to be generated and resulting in reduction in generation of features irrelevant to the objective variable. This shortens the time required to generate features as well as the time required to select the features.

The calculation operation may be an arithmetic calculation using such as "SUM" or "MAX" or a logical operation using such as "AND" or "OR", or the calculation operation may be performed by using the arithmetic operation and the logical operation in combination.

According to a second aspect of the invention, the supplementary information may include a degree of importance.

This structure enables discrimination between a feature that is considered important by the user and a feature that is considered not important by the user, whereby the features to be generated are further effectively narrowed down.

According to a third aspect of the invention, the additional rule may include a rule that prevents a calculation operation of a combination of the plurality of features in which the degrees of importance of the supplementary information are less than a first predetermined value.

That is, the calculation operation based on the combination of the features with low degrees of importance tends to provide a feature with a low degree of importance, which scarcely contributes to generation of a prediction model. In this aspect of the invention, the calculation operation based on the combination of the features having degrees of importance of less than the first predetermined value is not performed, and thus, a feature with a low degree of importance is hardly generated, thereby improving an efficiency of calculation operations based on the features.

According to a fourth aspect of the invention, the additional rule may include a rule that allows a calculation operation of only a combination of the feature in which the degree of importance of the supplementary information is less than the first predetermined value and the feature in which the degree of importance of the supplementary information is equal to or greater than a second predetermined value, which is higher than the first predetermined value.

That is, the calculation operation using a combination of a feature with a low degree of importance and a feature with a high degree of importance tends to provide a new feature with a high degree of importance, even though the feature has a low degree of importance. Thus, instead of excluding every feature with a low degree of importance from the targets of the calculation operations, this feature is subjected to the calculation operation while being combined only with the feature with the high degree of importance. This increases the probability of obtaining a new knowledge.

According to a fifth aspect of the invention, the supplementary information may include a system of units.

This structure enables a physically meaningful combination of the systems of units to be included in the targets of the calculation operations and a physically meaningless combination of the systems of units to be excluded from the targets of the calculation operations. As a result, the features to be generated are further effectively narrowed down. For example, a combination of the systems of units may produce a unit indicating a quantity of heat, a flow rate, work, a rate of chemical reaction, or another physical quantity as a result of the calculation operation. This combination of the systems of units is determined as having a physical meaning and is subjected to the calculation operation. On the other hand, a combination of the systems of units may produce an impractical unit as a result of the calculation operation. This combination of the systems of units is determined as having no physical meaning and is not subjected to the calculation operation.

According to a sixth aspect of the invention, the additional rule may include a rule that allows no calculation operation except for subtraction, for a combination of the features in which the systems of units of the supplementary information are time.

In this structure, in the case of calculating based on the combination of the features in which the systems of units are time, addition, multiplication, or division therebetween tends to produce a feature that scarcely contributes to generation of the prediction model. For this reason, the above-described structure prevents such a calculation operation from being performed, thereby improving the efficiency of the calculation operations based on the features.

According to a seventh aspect of the invention, the supplementary information may include information relating to whether the feature is controllable by the user.

This structure enables the following information to be added to the supplementary information. That is, one that is varied or adjusted as desired by the user is a controllable feature, and one that is difficult to be varied or adjusted as desired by the user is an uncontrollable feature.

According to an eighth aspect of the invention, the additional rule may include a blacklist rule that specifies a condition for preventing a calculation operation for generating a new feature.

In this structure, features that tend to generate less effective features are listed by the blacklist rule on the basis of the supplementary information. If the blacklist rule is applicable, the calculation operation for generating a new feature is not performed, thereby improving the efficiency of the calculation operations based on the features.

According to a ninth aspect of the invention, the additional rule may include a whitelist rule that specifies a condition for allowing a calculation operation for generating a new feature.

If the whitelist rule is applicable in the above structure, the calculation operation is performed to generate a new feature.

According to a tenth aspect of the invention, the additional rule may include a whitelist rule that specifies a condition for allowing a calculation operation for generating a new feature, and the blacklist rule may be applied before the whitelist rule is applied.

That is, in a case in which an effective feature is included in the features which the blacklist rule is applicable to, such an effective feature may be used to generate a new feature.

According to an eleventh aspect of the invention, the additional rule may include a blacklist rule that specifies a condition for preventing a calculation operation for generating a new feature, and the whitelist rule may be applied before the blacklist rule is applied.

That is, the blacklist rule is applied after a lot of features are listed due to the applied whitelist rule, thereby narrowing down the features to be used for generating new features.

According to a twelfth aspect of the invention, the additional rule may include a selection forcing rule that specifies a condition for making the feature remain as a new feature at any time.

A feature that is evaluated as having a low degree of importance by the data analyzing device may be deleted even though the feature is considered important by a user. However, the selection forcing rule that includes, for example, a rule relating to the degree of importance, enables this feature to be used to generate a new feature in accordance with the degree of importance, thereby making this feature remain.

According to a thirteenth aspect of the invention, the data analyzing device may be configured to allow a user to add a type of the supplementary information.

This structure allows adding other type of the supplementary information in accordance with the need of the user, in addition to the supplementary information of existing type, whereby the features to be generated are further effectively narrowed down.

A fourteenth aspect of the invention provides a data analyzing method for analyzing analysis target data. The data analyzing method includes receiving an input of analysis target data including a plurality of features and an objective variable, displaying a list of the plurality of features input, adding supplementary information to each of the plurality of features in the displayed list based on an input by a user, and storing a fixed rule and an additional rule. The fixed rule specifies a rule of a calculation operation for generating a new feature from the feature alone or a combination of the plurality of features. The additional rule specifies whether to perform a calculation operation for generating the new feature on a basis of the added supplementary information, not depending on whether the fixed rule is applicable. The data analyzing method also includes generating a prediction model for predicting the objective variable from the plurality of features, on the basis of the fixed rule and the additional rule that are stored.

In the present invention, the objective variable is predicted on the basis of the fixed rule and the additional rule. The fixed rule specifies a rule of a calculation operation for generating a new feature from the feature alone or a combination of the plurality of features. The additional rule specifies whether to perform a calculation operation for generating the new feature on a basis of the added supplementary information, not depending on whether the fixed rule is applicable. This enables effectively narrowing down the features, thereby generating effective features at a high speed.

BRIEF DESCRIPTION OF THE DRAWINGS

FIG. 6 shows an example of analysis target data;

FIG. 9 shows an example of a list of features automatically generated;

FIG. 10 shows examples of blacklist rules;

FIG. 11 is the list shown in FIG. 9 after the blacklist rules are applied;

FIG. 12 shows examples of whitelist rules;

FIG. 13 is the list shown in FIG. 9 after the whitelist rules are applied;

FIG. 14 shows an example of a selection forcing rule; and

FIG. 15 shows a feature display user interface.

DESCRIPTION OF EMBODIMENTS

Embodiments of the present invention are explained in detail below with reference to the drawings. However, the following descriptions of the embodiments are substantially only illustrations and are not intended to limit the present invention, objects using the present invention, and use of the present invention.

Figure 1:
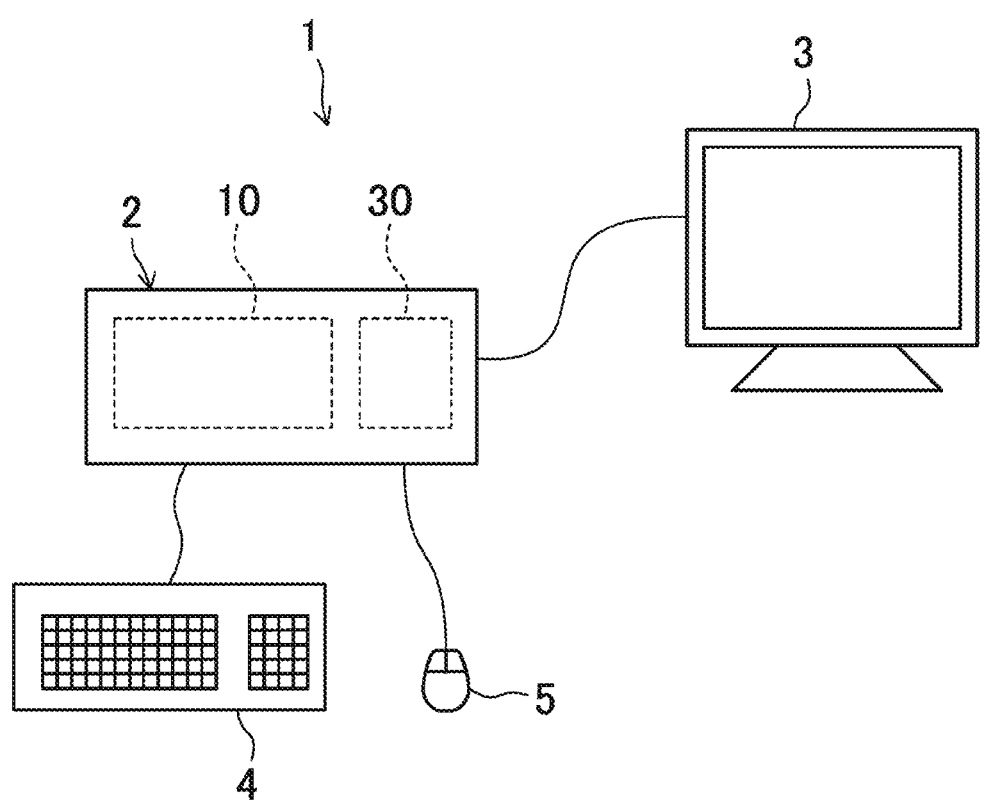
FIG. 1 shows a schematic configuration of a data analyzing device according to an embodiment of the present invention.
Figure 2:
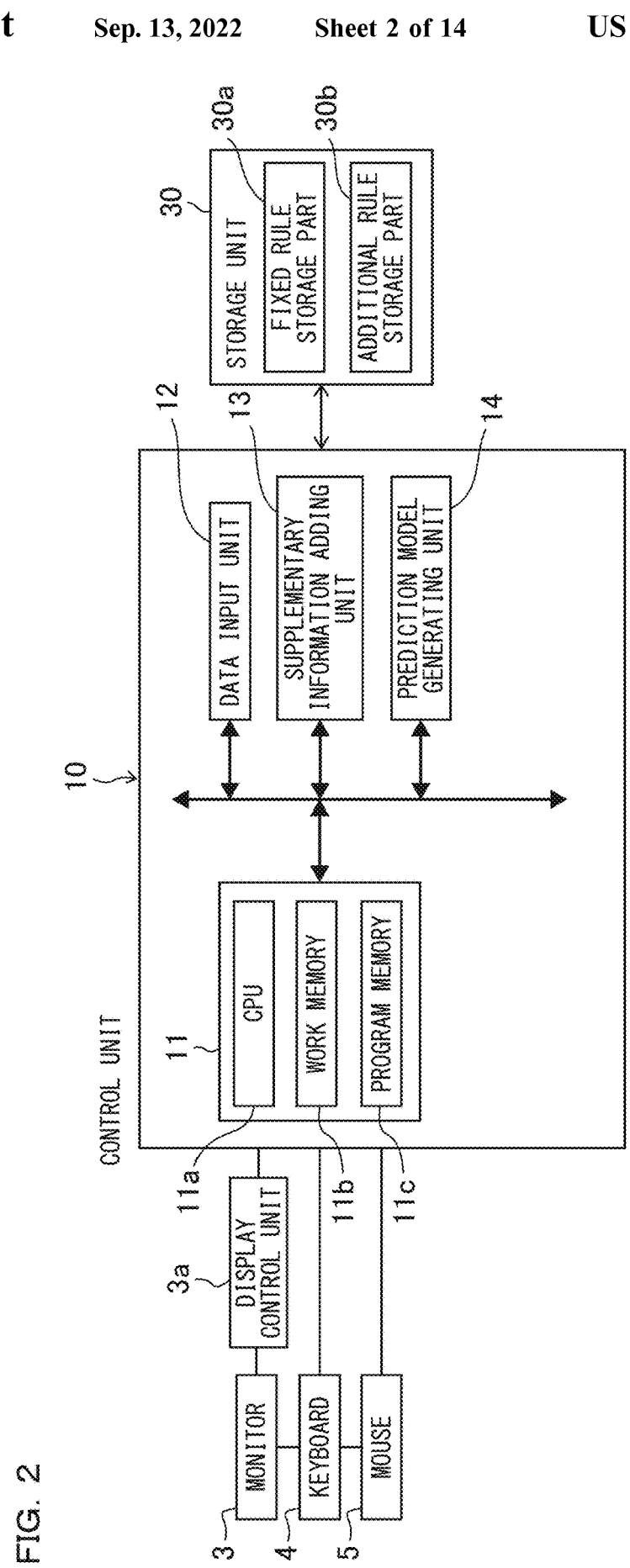
FIG. 2 is a block diagram of the data analyzing device.

FIG. 1 shows a schematic configuration of a data analyzing device 1 according to an embodiment of the present invention. FIG. 2 is a block diagram of the data analyzing device 1. The data analyzing device 1 analyzes analysis target data and is used to execute a data analyzing method according to the present invention. The data analyzing device 1 and the data analyzing method can be used in trying to acquire a useful unknown knowledge from a large volume of information, generally called "data mining".

Data Analysis Procedure

Figure 3:
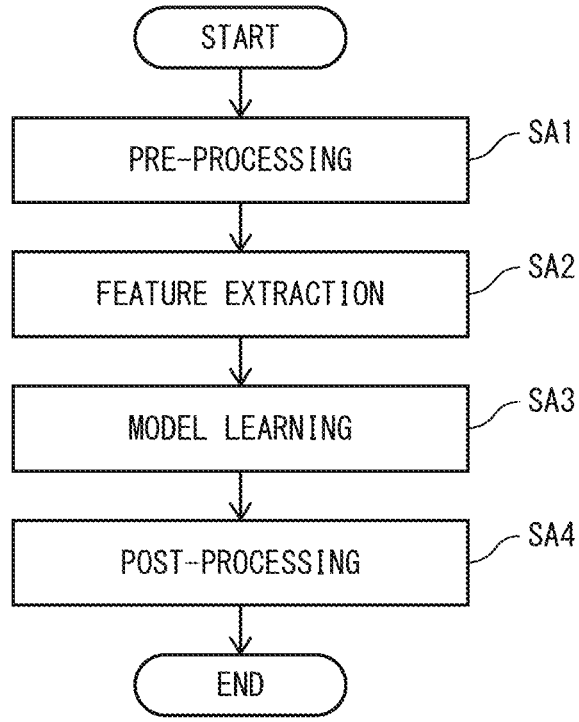
FIG. 3 is a flowchart showing a data analysis procedure.

A typical data analysis procedure is described with reference to a flowchart shown in FIG. 3. After the data analysis is started, a pre-processing step is executed in step SA1. In the pre-processing step, operations such as collecting data necessary for analysis or analysis target data, and removing unnecessary noise from the data and filling a missing item to improve the efficiency of the analysis are performed. These operations are collectively referred as "ETL (extract, transform, and load)". A feature extracting step is executed in step SA2. In the feature extracting step, a feature that exists in the original data is manipulated to generate a new feature more useful for the analysis. A model learning step is executed in step SA3. In the model learning step, data that is prepared in the pre-processing step and the feature extracting step is input to a machine learning algorithm to obtain analysis result. A post-processing step is executed in step SA4. In the post-processing step, the analysis result obtained in the model learning step is subjected to a process such as outputting it to an external device or generating a report based thereon.

Overall Configuration of Data Analyzing Device 1

As shown in FIGS. 1 and 2, the data analyzing device 1 includes a device body 2, a monitor 3, a keyboard 4, and a mouse 5. The monitor 3, the keyboard 4, and the mouse 5 are connected to the device body 2. For example, it is possible to embody the data analyzing device 1 by installing a program in a general-purpose personal computer. Alternatively, it is also possible to construct the data analyzing device 1 by dedicated hardware installed with the program. The program executes control contents, which are described later. The device body 2 and the monitor 3 may be combined into one body, or a part of the device body 2 may be incorporated to the monitor 3.

The data analyzing device 1 incorporates a communication module (not shown) and is communicable with the outside. This enables downloading data from an external server via an internet line.

The keyboard 4 and the mouse 5 are means for controlling the data analyzing device 1 and also function as other means such as a means for inputting various kinds of information and a means for performing selection operation. In addition to or instead of the keyboard 4 and the mouse 5, a touch panel input device, a voice input device, a stylus input device, or another device may also be used.

Structure of Monitor 3

The monitor 3 shown in FIG. 1 may use, for example, an organic EL display, a liquid crystal display, or another device. The monitor 3 only may be referred as a display unit or the monitor 3 in combination with a display control unit 3a may be referred as a display unit. The display control unit 3a is shown in FIG. 2. The display control unit 3a may be integrated in the monitor 3 or in the device body 2. The display control unit 3a is constituted of a component such as a display DSP for displaying an image on the monitor 3. The display control unit 3a may also include a video memory that temporarily stores image data at the time of displaying the image, such a VRAM. The display control unit 3a transmits a control signal for displaying a predetermined image, to the monitor 3 on the basis of a display instruction or a display command transmitted from a CPU 11a of a main control unit 11, which is described later. For example, the display control unit 3a also transmits control signals for displaying various kinds of user interfaces, icons, and contents operated by a user using the keyboard 4 or the mouse 5, on the monitor 3. In addition, it is also possible to display a pointer or the like that is controllable by the mouse 5, on the monitor 3.

The monitor 3 may use a touch operation panel monitor to have a function for inputting various kinds of information.

Overall Configuration of Device Body 2

The device body 2 shown in FIG. 1 includes a control unit 10 and a storage unit 30. The storage unit 30 is constituted of a hard disk drive, a solid state drive (SSD), or another component. The storage unit 30 is connected to the control unit 10 to be controlled by the control unit 10 and is able to store various kinds of data as well as read the stored data. As shown in FIG. 2, the storage unit 30 includes a fixed rule storage part 30a that stores a fixed rule and also includes an additional rule storage part 30b that stores an additional rule. The fixed rule and the additional rule are described later. The storage unit 30 may be provided in the control unit 10.

Control Unit 10

Although not specifically illustrated in the drawings, the control unit 10 may be constituted of an MPU, a system LSI, a DSP, a dedicated hardware, or another component. The control unit 10 has various kinds of functions as described later. These functions may be implemented by logic circuits or by executing software.

As shown in FIG. 2, the control unit 10 includes the main control unit 11, a data input unit 12, a supplementary information adding unit 13, and a prediction model generating unit 14. The supplementary information adding unit 13 may also be called a "meta-information adding unit". Each unit of the control unit 10 is described separately, but one unit may execute plural kinds of processes or each unit may further be separated so that one process will be executed by cooperative operation of these separated units.

The above-described pieces of hardware are connected to each other in a bidirectionally or unidirectionally communicable manner via an electrical communication path or wiring, such as a bus.

The main control unit 11 performs numerical calculation and information processing on the basis of respective programs and also performs control of each piece of hardware. The main control unit 11 includes the CPU 11a, a work memory 11b, such as a RAM, and a program memory 11c, such as a ROM, a flash ROM, or an EEPROM. The CPU 11a functions as a central processing unit. The work memory 11b functions as a work area when the main control unit 11 executes various kinds of programs. The program memory 11c stores information such as a startup program and an initialization program.

Figure 5:
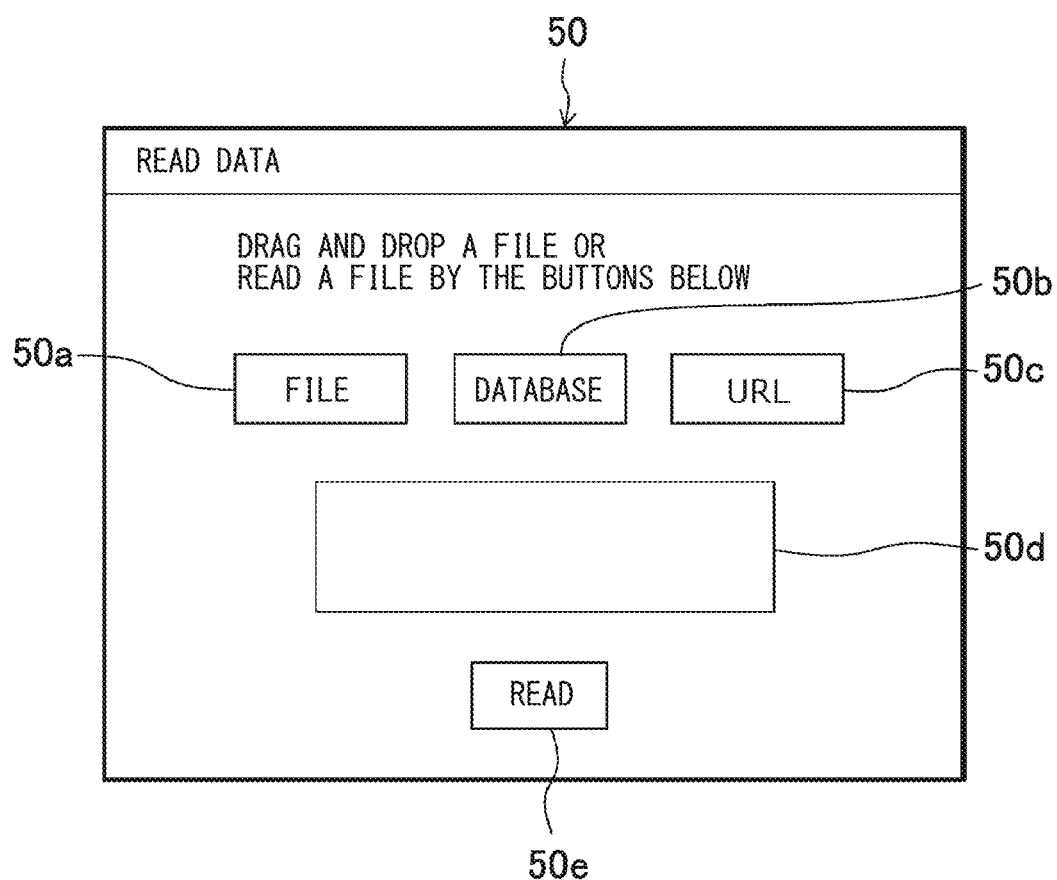
FIG. 5 shows a data input user interface.

The data input unit 12 receives an input of analysis target data including a plurality of features and an objective variable. The data input unit 12 displays a data input user interface 50 as shown in FIG. 5, on the monitor 3 and receives an operation of a user, which is performed on the data input user interface 50. The operation of the user includes an operation on the keyboard 4 and an operation on the mouse 5, such as clicking a button, dragging and dropping, and rotating a wheel.

The analysis target data includes a plurality of features and an objective variable. The plurality of features are data including one or plural kinds of features, such as one originally existing in the analysis target data (existing feature) and one newly generated (new feature). The analysis target data may be partially missed. In this case, operation for filling the missing item may be performed.

The data input user interface 50 shown in FIG. 5 is provided with a file selection button 50a, a database selection button 50b, a URL designation button 50c, a database display region 50d, and a reading start button 50e. Each the buttons is freely layout.

For example, in a case in which a file including analysis target data is stored in an external storage device or the storage unit 30, and the file is on a desktop or in an open file, the user drags and drops the file to the database display region 50d. Thus, the name of the file including the analysis target data is displayed in the database display region 50d. Thereafter, in response to pressing the reading start button 50e, the file displayed in the database display region 50d is read and stored in a predetermined region of the storage unit 30.

In a case in which the analysis target data exists in the database, the user presses the database selection button 50b. In response to pressing the database selection button 50b, a setting screen (not shown) for accessing the database is displayed, and an input of a table name and, as necessary, an input of a password, are prompted to the user. Thereafter, in response to pressing the reading start button 50e, the analysis target data in a predetermined file format is read and stored in a predetermined region of the storage unit 30, and the name of the file including the analysis target data is displayed in the database display region 50d.

In a case in which the analysis target data exists in the Internet or in a server, the user presses the URL designation button 50c. After the URL designation button 50c is pressed, a URL input screen (not shown) is displayed, and an input of a URL is prompted to the user. Thereafter, in response to pressing the reading start button 50e, the analysis target data is downloaded and is read and stored in a predetermined file format in a predetermined region of the storage unit 30, and the name of the file including the analysis target data is displayed in the database display region 50d.

There may be one or plural files that include the analysis target data. The file may be read by a method other than these three methods. The format of these files may be a CSV format, but other formats may also be used. The above-described process corresponds to a data input step in step SB1 in the flowchart shown in FIG. 4.

FIG. 6 shows an example of the analysis target data in a table form. In this example, features are laterally arranged at the uppermost row in the table. There are ten features: "Measurement time", "Elapsed time", "Set pressure", "Set temperature", "Yield of substance A", "Yield of substance B", "Input of substance C", "Rate of stirring", "Difference in cooling temperature", and "Flow rate of cooling water". Each data is arranged in time series. This data in the table form may or may not be displayed on the monitor 3.

After the analysis target data is input, a data manipulating step may also be performed. The data manipulating includes removal of a missing value in the analysis target data, filling up of the analysis target data, replacement of the analysis target data, and deletion of a column, and deletion of a row.

Figure 7:
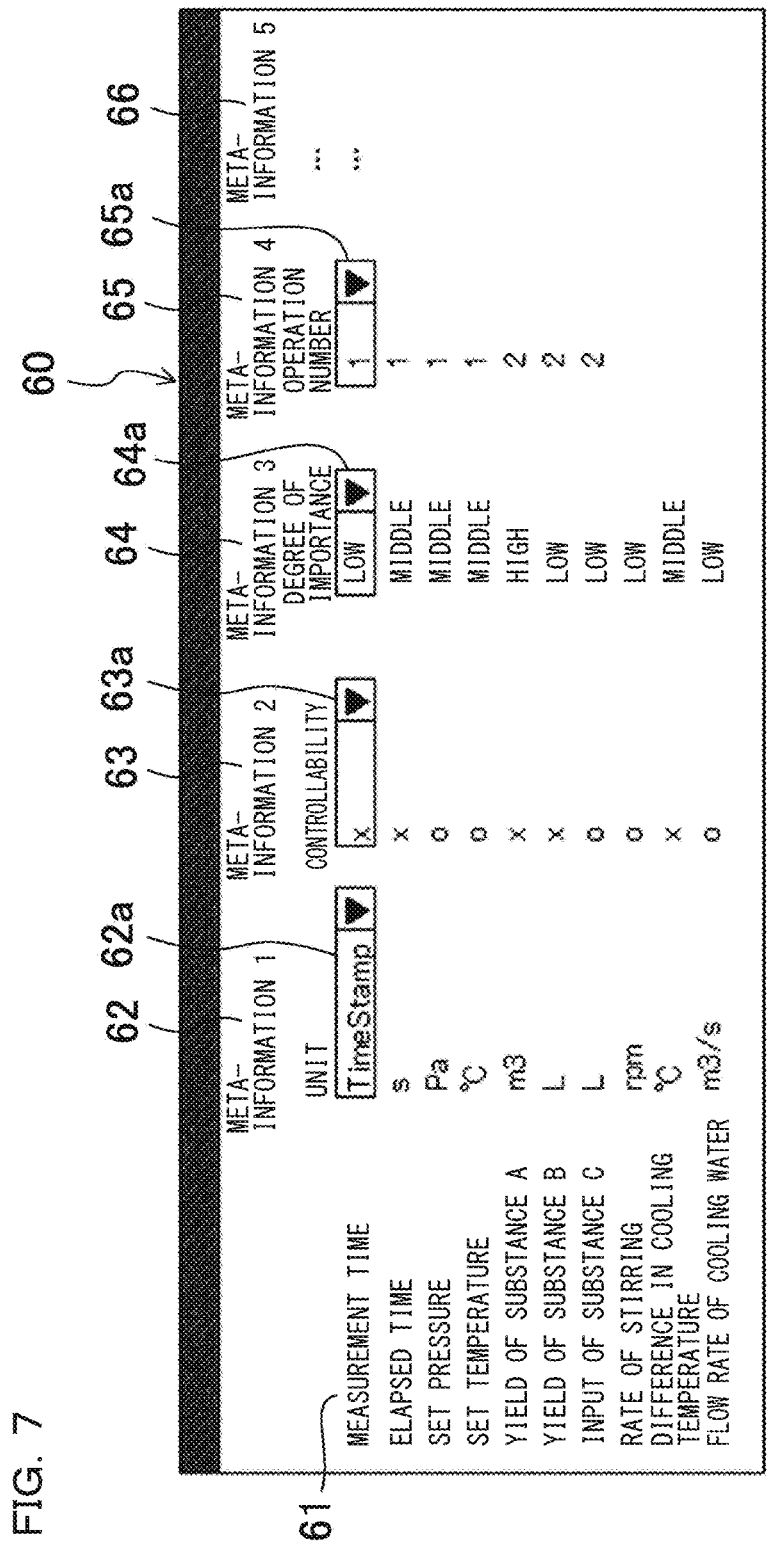
FIG. 7 shows a meta-information setting user interface.

Step SB1 is followed by step SB2 that is a meta-information setting step. The meta-information setting step is executed by the supplementary information adding unit 13 shown in FIG. 2 as instructed by a user. The meta-information setting step includes two steps. First, a feature displaying step is executed. After the data input step is completed, the supplementary information adding unit 13 detects the completion of the data input step. Then, the supplementary information adding unit 13 displays a meta-information setting user interface 60, as shown in FIG. 7, on the monitor 3 and receives an operation of the user on the meta-information setting user interface 60. The meta-information corresponds to the supplementary information of the present invention and may also be called "incidental information added to data", "information explaining an attribute of data", or the like.

The meta-information setting user interface 60 is provided with a list display region 61, a first meta-information input region 62, a second meta-information input region 63, a third meta-information input region 64, a fourth meta-information input region 65, and a fifth meta-information input region 66. Some descriptions for the fifth meta-information input region 66 are omitted in the drawing. FIG. 7 shows five meta-information input regions. However, the number of the meta-information input regions is not limited to five, and it may be four or less or six or more.

The list display region 61 shows a list of a plurality of features that are input in the data input step. Listing the plurality of features in the list display region 61 allows the plurality of features to be displayed on the monitor 3 in a manner visually recognizable by the user. This step is a feature displaying step. FIG. 7 shows the plurality of features that are displayed in a vertically arranged manner, but the plurality of features may be displayed in a laterally arranged manner.

The first meta-information input region 62 allows the user to input a unit of each of the features shown in the list display region 61, as meta-information. A drop-down list button 62a may be displayed in the first meta-information input region 62 so as to correspond to each of the features shown in the list display region 61. The drop-down list button 62a may be displayed by operating the mouse 5 to select the unit of each of the features. For the feature "Measurement time", the unit is year, month, day and time, minute, or second. For the feature "Elapsed time", the unit is second (s). For the feature "Set pressure", the unit is pascal (Pa). For the feature "Set temperature", the unit is Celsius degree (° C.). For the feature "Yield of substance A", the unit is a cubic meter ($m^3$). For each of the features "Yield of substance B" and "Input of substance C", the unit is liter (l). For the feature "Rate of stirring", the unit is rpm. For the feature "Difference in cooling temperature", the unit is Celsius degree (° C.). For the feature "Flow rate of cooling water", the unit is $m^3/s$. When the user inputs the unit of each of the features, unit system information is added to each of the corresponding features as meta-information in accordance with the input operation of the user. That is, the supplementary information adding unit 13 is able to add meta-information to each of the features listed on the monitor 3, on the basis of an input of the user. This step is a supplementary information adding step or meta-information adding step.

The second meta-information input region 63 allows the user to input information relating to whether each of the features shown in the list display region 61 is controllable, as meta-information. In a case in which it is possible for the user to perform operation such as changing the volume, adjusting the volume to a specific volume, and adjusting the volume to zero, the feature is determined to be controllable by the user. On the other hand, in a case in which it is difficult for the user to perform operation such as changing and adjusting, the feature is determined to be uncontrollable by the user. The feature that is controllable by the user is represented by a mark "○", whereas the feature that is uncontrollable by the user is represented by a mark "x". A drop-down list button 63a may also be displayed in the second meta-information input region 63 so as to correspond to each of the features shown in the list display region 61. The drop-down list button 63a may be displayed by operating the mouse 5 to select the state of each of the features between the state "controllable" and the state "uncontrollable". When the user inputs the information whether each of the features is controllable, controllability information is added to each of the corresponding features as meta-information in accordance with the input operation of the user.

The third meta-information input region 64 allows the user to input a degree of importance of each of the features shown in the list display region 61, as meta-information. The degree of importance is based on the thought of the user. When the user considers the feature important, a value "high" is input. When the user considers the feature not important, a value "low" is input. The degree of importance may be input by multistage. For example, the feature may be evaluated by three stages of "high", "middle", and "low" in order from the higher importance, by three stages of numerical values, or by using marks such as "A", "B", "C", and "D". In the example shown in FIG. 7, the degree of importance is evaluated by three stages of "high", "middle", and "low". A drop-down list button 64a may also be displayed in the third meta-information input region 64 so as to correspond to each of the features shown in the list display region 61. The degree of importance that is included in the meta-information enables discrimination between a feature that is considered important by the user and a feature that is considered not important by the user.

The fourth meta-information input region 65 allows the user to input an operation number of each of the features shown in the list display region 61, as meta-information. The operation numbers are assigned in the process order in a case of manufacturing a product, such as an article or a chemical agent. A drop-down list button 65a may also be displayed in the fourth meta-information input region 65 so as to correspond to each of the features shown in the list display region 61. The drop-down list button 63a may be displayed by operating the mouse 5 to input the operation number of each of the features. A feature that relates to all processes may not be assigned with the operation number.

The operation number is merely an example. In one example, in a case of using sales data as the analysis target data, a store number, a store name, or another value may be used. The operation number and the store number may be used as group numbers as superordinate concepts. The group information is added as meta-information to each of the features in accordance with the input operation of the user.

In this embodiment, at least the unit system information, the controllability information, the importance degree information, and the group information are added to each of the features. From this point of view, the supplementary information adding step enables adding different types of meta-information to each of the features.

Moreover, it is also possible that the user adds any other type of the meta-information. For example, an adding button (not shown) for meta-information may be provided to the meta-information setting user interface 60. In response to operation of the user on the adding button, the number of the meta-information input regions is increased, thereby enabling input of meta-information of another type in the meta-information input region newly generated.

Figure 4:
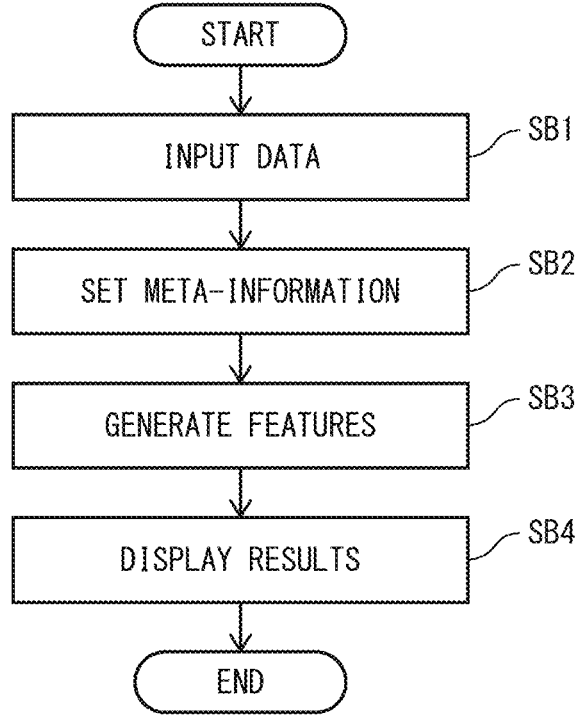
FIG. 4 is a flowchart showing operation of the data analyzing device.

These steps are the meta-information setting step in step SB2 shown in FIG. 4. Step SB2 is followed by step SB3 that is a feature generating step. The feature generating step is illustrated in detail in the flowchart shown in FIG. 8, which is described below. The feature generating step allows automatic feature generation. After the features are automatically generated, the processing advances to step SB4 shown in FIG. 4, and information of the generated features are output.

Details of Feature Generating Step

The following describes details of the feature generating step. In Step SC1 in the flowchart shown in FIG. 8, every combination of functions is prepared. At this time, the fixed rule is applied.

Details of Fixed Rule

In this example, eight calculation operations are defined, and each of the calculation operations is combined with each of the features. The basic combination processes are addition (+), subtraction (−), multiplication (×), and division (÷) as binary arithmetic operations and are summation (SUM), averaging (AVG), obtaining maximum (MAX), and obtaining minimum (MIN) as aggregation operations. As shown in FIG. 7, the number of the original features is 10, and therefore, the number of defined all combinations of the binary arithmetic operations is 10×10×4, and the number of defined aggregation operations is 10×4. The total number is 440, and these defined operations are added in a list of features to be generated, as shown in FIG. 9.

The list shown in FIG. 9 describes only some of the features to be generated, but all combinations are generated as described above. At this stage, the listed features to be generated are based on only assumptions, and calculation operations are not performed actually. Even though the number of the features that are assumed to be generated is great at this stage, the burden of calculation is scarcely caused.

The summation (SUM), averaging (AVG), obtaining maximum (MAX), and obtaining minimum (MIN) are rules of calculation operation for generating a new feature from the original feature alone and is capable of constituting the fixed rule. The addition (+), subtraction (−), multiplication (×), and division (÷) are rules of calculation operation for generating a new feature by combining the plurality of features, and these are also capable of constituting the fixed rule. The fixed rules prepared therefrom are stored in the fixed rule storage part 30$a$ of the storage unit 30 shown in FIG. 2. The fixed rules may not include all of these rules, and any one or more of these rules may be used. The fixed rules may include other rule other than above and may include, for example, an involution of the original feature alone. It is possible that the user selects one or plural fixed rules from among the plural fixed rules. The step of storing the fixed rules in the fixed rule storage part 30$a$ is a rule storing step. This step may be performed before or after the data input step.

Figure 8:
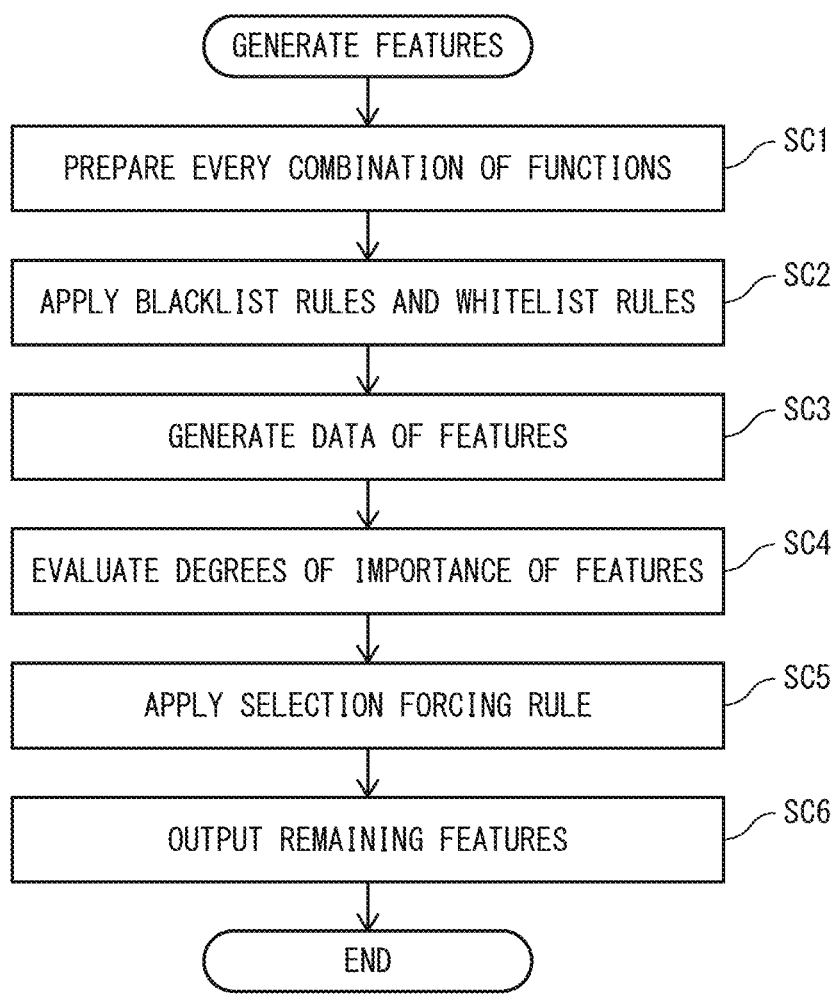
FIG. 8 is a flowchart of processing for generating features.

In step SC2 following step SC1 in the flowchart shown in FIG. 8, the blacklist rule and the whitelist rule are applied. The blacklist rule and the whitelist rule are included in the additional rule.

Details of Additional Rule

The additional rule specifies, on the basis of the meta-information, whether to perform calculation operation for generating a new feature, not depending on whether the fixed rule is applicable. The meta-information is able to be added by the supplementary information adding unit 13. The additional rule is stored in the additional rule storage part 30$b$ of the storage unit 30 shown in FIG. 2. The step of storing the additional rule in the additional rule storage part 30$b$ is also included in the rule storing step. This step may be performed before or after the data input step.

The additional rule is roughly divided into three types of rules. The three types of the rule are: a blacklist rule specifying a condition for preventing a calculation operation for generating a new feature, a whitelist rule specifying a condition for allowing a calculation operation for generating a new feature, and a selection forcing rule.

Blacklist Rule

The blacklist rule is a rule of determining the feature that generates a less effective feature by using the meta-information. Those which the blacklist rule is applicable to are not subjected to the calculation operation, thereby not generating a new feature.

FIG. 10 shows examples of the blacklist rules. The blacklist rule is constituted of a rule ID, a rule associated with the rule ID, and a meta-information associated with the rule ID. Plural pieces of the meta-information define the blacklist rules. The rule IDs are assigned to respective rules.

The blacklist rules may include a rule that "a combination of a feature represented by a time stamp and a feature represented by a time stamp is subjected to no calculation operation except for subtraction". This rule is assigned with a rule ID "B1". This rule allows no calculation operation except for subtraction, for the combination of features in which the systems of units of the meta-information are time. For example, among the features shown in FIG. 7, the feature in which the system of units is time is "Measurement time". In the case of calculating based on the combination of the features in which the systems of units are time, addition, multiplication, or division therebetween tends to produce a feature that scarcely contributes to generation of a prediction model. For this reason, the above-described rule is defined in the blacklist rule not to allow such a calculation operation to be performed. The type of the meta-information that is used in the rule of the rule ID "B1" is the unit system information.

The blacklist rules may also include a rule that "a feature with a low degree of importance is combined only with a feature with a high degree of importance". This rule is assigned with a rule ID "B2". This rule uses the importance degree information of the meta-information. The low degree of importance and the high degree of importance can be considered as values of the degrees of importance. For example, the low degree of importance is assumed to be a value indicating a degree of importance of less than a first predetermined value. In this case, the rule of the rule ID "B2" prevents a calculation operation of a combination of features in which the degrees of importance of the meta-information are less than the first predetermined value. That is, the calculation operation based on the combination of the features with low degrees of importance tends to provide a feature with a low degree of importance, which scarcely contributes to generation of the prediction model. In this example, the calculation operation based on the combination of the features having the degrees of importance of less than the first predetermined value is not performed, and thus, a feature with a low degree of importance is hardly generated, thereby improving an efficiency of calculation operations based on the features. The first predetermined value may be, for example, set at the middle degree of importance.

From another point of view, the rule of the rule ID "B2" allows a calculation operation of only a combination of a feature with a low degree of importance and a feature with a degree of importance of greater than the low degree of importance. For example, the low degree of importance is assumed to be a value indicating a degree of importance of less than a first predetermined value, and the high degree of importance is assumed to be a value indicating a degree of importance of equal to or greater than a second predetermined value. In this case, the rule of the rule ID "B2" allows a calculation operation of only a combination of a feature in which the degree of importance of the meta-information is less than the first predetermined value and a feature in which the degree of importance of the meta-information is equal to or greater than the second predetermined value, which is higher than the first predetermined value. The rule of the rule ID "B2" may allow a calculation operation of only a combination of the feature with the low degree of importance and a feature with a middle degree of importance.

The blacklist rules may also include a rule that "a feature with a low degree of importance is not subjected to an accumulating process". This rule is assigned with a rule ID "B3". This rule uses the importance degree information of the meta-information. This rule prevents an accumulating process of a feature in which the degree of importance of the meta-information is less than a first predetermined value. That is, accumulation of the features with low degrees of importance tends to provide a feature with a low degree of importance, which scarcely contributes to generation of the prediction model. For this reason, such a rule is specified.

The blacklist rules may also include a rule that "features having different operation numbers are not combined together". This rule is assigned with a rule ID "B4". This rule uses the group information of the meta-information. This rule prevents a calculation operation of a combination of features relating to different operations among plural operations. For example, a calculation operation of a combination of a feature relating to a first process and a feature relating to a second process tends to produce a feature that scarcely contributes to generation of the prediction model, because the first process and the second process are different from each other. For this reason, such a rule is specified. Instead of the operation number, a store number or another information may be used.

The blacklist rules may also include a rule that "a feature with a low degree of importance and being uncontrollable is not subjected to a calculation operation". This rule is assigned with a rule ID "B5". This rule uses the importance degree information and the controllability information of the meta-information. The feature that is "uncontrollable" is uncontrollable by the user. Thus, this rule prevents a calculation operation of a feature in which the degree of importance of the meta-information is less than a first predetermined value and which is uncontrollable by the user. That is, the calculation operation of the feature having a low degree of importance and being uncontrollable tends to provide a feature that scarcely contributes to generation of the prediction model. For this reason, such a rule is specified.

The blacklist rules may also include a rule other than the rules described above. Moreover, a rule that is defined by the user may also be added in the blacklist rules. In addition, it is possible to delete any of the rules included in the blacklist rules.

FIG. 11 shows a list indicating features that are not to be generated due to the applied blacklist rules and features that are to be generated even after the blacklist rules are applied. The list shows these features in a discriminable manner. Only the features that are not to be generated due to the applied blacklist rules are grayish-colored, and these features are excluded from the targets of the calculation operations. As shown in the drawing, applying the blacklist rules prevents calculations of physically meaningless amounts and combining amounts that can have no interaction therebetween, thereby reducing features that are considered less effective. Representing the intuition of the user by the degree of importance enables narrowing down the features more efficiently.

Whitelist Rule

The whitelist rule allows determining the condition that is considered as highly effective for generating the prediction model, by using the meta-information. Among the original features shown in FIG. 9, the feature that the whitelist rule is applicable to is to be subjected to the calculation operation. The whitelist rule may be applied before or after the blacklist rule is applied. In the case of applying the blacklist rule prior to the application of the whitelist rule, a feature that is deleted once due to the applied blacklist rule is restored on the condition that the whitelist rule is applicable to the feature. The restoring causes the feature that is excluded once from the targets of the calculation operations to be included in the targets of the calculation operations again.

FIG. 12 shows examples of the whitelist rules. The whitelist rule is constituted of a rule ID, a rule associated with the rule ID, and a type of the meta-information associated with the rule ID. Plural pieces of the meta-information define the whitelist rules. The rule IDs are assigned to the respective rules.

The whitelist rules may include a rule: "unit [Pa]×unit [rpm]". This rule is assigned with a rule ID "W1". This rule uses the unit system information of the meta-information.

The whitelist rules may include a rule: "unit [m$^3$/s]×unit [° C.]". This rule is assigned with a rule ID "W2". This rule uses the unit system information of the meta-information.

The whitelist rules may include a rule: "log (unit [s])". This rule is assigned with a rule ID "W3". This rule uses the unit system information of the meta-information.

The whitelist rules may include a rule: "$\sqrt[3]{}$ (unit [m$^3$])". This rule is assigned with a rule ID "W4". This rule uses the unit system information of the meta-information.

The whitelist rules may include a rule: "MEAN (degree of importance [high])". This rule is assigned with a rule ID "W5". This rule uses the importance degree information of the meta-information.

The "unit (Pa)×unit (rpm)" of the rule ID "W1" represents work (W). The "unit (m$^3$/s)×unit (° C.)" of the rule ID "W2" represents a quantity of heat (cal/s). The "log (unit [s])" of the rule ID "W3" represents a unit of a rate of chemical reaction. The work, the quantity of heat, and the rate of chemical reaction are commonly used quantities. In view of this, these physical quantities are calculated as features because they are expected to contribute to improving the analysis accuracy and facilitating understanding. For this reason, these rules are defined in the whitelist rules.

In this example, a feature with a high degree of importance is further subjected to a calculation operation of "MEAN". This prevents the feature with the high degree of importance from being excluded from the targets of the calculation operations.

The whitelist rules may also include a rule other than the rules described above. Moreover, a rule that is defined by the user may also be added in the whitelist rules. In addition, it is possible to delete any of the rules included in the whitelist rules.

FIG. 13 shows a list indicating a case of features that are applied with the whitelist rules after the blacklist rules are applied. Only the features that are not to be generated are grayish-colored. Comparing FIG. 11 with FIG. 13, some of the features that are not to be generated due to the applied blacklist rules (shown in FIG. 11) are restored in FIG. 13. Thus, among the features that are deleted due to the applied blacklist rules, a feature of a commonly used quantity and a feature with a high degree of importance are included again in the targets of the calculation operations instead of making all of the features remain deleted uniformly.

Applying the whitelist rules enables selectively generating a feature relating to a physically meaningful quantity and to an element with a high degree of importance, thereby further improving the analysis accuracy. Moreover, a rule may be added by the user to make the knowledge of the user for the analysis target taken in the data analyzing device 1, thereby further improving the analysis accuracy.

In the case of applying the blacklist rules after the whitelist rules are applied, a large number of features are included in the targets of the calculation operations by the applied whitelist rules, and thereafter, the features are narrowed down to features to be actually subjected to the calculation operations by the applied blacklist rules.

In step SC2 in the flowchart shown in FIG. 8, both the blacklist rules and the whitelist rules are applied to determine features to be generated, as described above. Thus, a list of the features to be generated is completed as shown in FIG. 13. The list may be displayed on the monitor 3.

Step SC2 may be performed by applying only the blacklist rules to determine features to be generated. In addition, as described above, the application order of the blacklist rules and the whitelist rules is not specifically limited. It is also possible that the user selects the application order of the blacklist rules and the whitelist rules.

In step SC3, calculation operations with the features determined in step SC2 are performed to generate data of features. In the following step SC4, feature selection is performed, and a degree of importance of each of the generated features is calculated. The calculated degree of importance differs from the degree of importance that is input by the user, and thus, it is called a "calculated degree of importance".

In this case, a known feature selection algorithm can be used. For example, coefficients a1, a2, . . . , in multiple regression analysis represented by the following formula (1) may be estimated, and absolute values thereof may be used as evaluation values for features x1, x2, . . . , respectively.

$$y = a1x1 + a2x2 + \ldots + anxn \quad (1)$$

Alternatively, instead of directly using the coefficients, the coefficients may be corrected so that the magnitudes of the features x1, x2, . . . , will coincide with each other, thereby obtaining normalization coefficients, and the normalization coefficients may be used as the calculated degrees of importance.

In normal feature selection, only a feature with a calculated degree of importance that exceeds a specific threshold or a feature with a higher calculated degree of importance may be extracted and selected by the control unit 10, and this selected feature may be displayed on the monitor 3. In this embodiment, instead of the normal feature selection or after the normal feature selection is performed, a selection forcing rule is applied. That is, after the degree of importance that is calculated in step SC4 in the flowchart shown in FIG. 8 is evaluated, the processing advances to step SC5 to apply the selection forcing rule. The application of the selection forcing rule is optionally and may not be performed. It is also possible that the user selects the necessity of the application of the selection forcing rule.

Selection Forcing Rule

The selection forcing rule is included in the above-described additional rule and makes the listed feature remain as a new feature at any time. FIG. 14 shows an example of the selection forcing rule. The selection forcing rules are constituted of rule IDs, rules associated with the respective rule IDs, and the types of the meta-information associated with the respective rule IDs. Plural pieces of the meta-information may define the selection forcing rules. The rule IDs are assigned to the respective rules.

The selection forcing rules may include a rule: "controllable". This rule is assigned with a rule ID "S1." The feature that is "controllable" is controllable by the user. Thus, this rule makes a feature that is controllable by the user restored and remain as a feature even though it is deleted due to the blacklist rule. The reason for this is that the feature that is controllable by the user has a high degree of contribution in some cases. The feature that the selection forcing rule is applicable to is made to remain even though a low degree of importance is input for this feature by the user. This prevents unintentional deletion of a feature that the user desires to leave, in the data analyzing device 1.

Output of Features

Thus, the listed features to be generated as new features are made to remain. In step SC6 in the flowchart shown in FIG. 8, the remaining features are output. This step corresponds to step SB4 in the flowchart shown in FIG. 4. In response to selection of the features to be output, the control unit 10 displays a feature display user interface 70, as shown in FIG. 15, on the monitor 3 and receives an operation of the user on the feature display user interface 70.

The feature display user interface 70 shows the features that are newly generated. Features with higher calculated degrees of importance may be displayed in the feature display user interface 70. In this case, a plurality of features with higher calculated degrees of importance are displayed in the order of higher calculated degree of importance, that is, displayed in a ranking format. In this example, a feature having the highest calculated degree of importance and a plurality of features having calculated degrees of importance of less than the highest calculated degree of importance are displayed at the same time. The feature having the highest calculated degree of importance is displayed at the highest position, and the features having calculated degrees of importance of less than the highest calculated degree of importance are arranged in descending order of the calculated degree of importance. The features may be arranged in ascending order or in a left and right direction in parallel. The number of the features to be displayed may be any appropriate number and is not specifically limited.

Specifically, the feature display user interface 70 is provided with a ranking display region 71, an importance degree display region 72, a feature display region 73, an applied rule display region 74, and a physical quantity display region 75. The ranking display region 71 displays rankings in accordance with the calculated degrees of importance. The rank "No. 1" indicates the highest calculated degree of importance. As the number of the rank increases, the calculated degree of importance decreases.

The importance degree display region 72 displays the calculated degree of importance. The degree of importance that is displayed in the importance degree display region 72 may be a numerical value or a figure such as in a bar graph form. In this embodiment, a feature having the highest calculated degree of importance is ranked "No. 1". In addition, the degrees of importance are displayed so as to be compared with each other by numerical values, and the degrees of importance are also displayed so as to be compared with each other by figures while the feature having the highest calculated degree of importance has the longest bar.

The feature display region 73 displays the name of the feature that is automatically generated. The displayed name is based on the name of the feature existing in the analysis target data. The name of the feature existing in the analysis target data may be displayed without any change. Alternatively, to make it possible to know the performed calculation operation, the name of the feature may be displayed in a calculation expression form, such as "Set temperature×Flow rate of cooling water".

The applied rule display region 74 displays the rule applied in generating the feature. The applied rule display region 74 displays the rule ID. The symbol "W" indicates a feature that is generated based on the whitelist rule. The symbol "S" indicates a feature that is generated based on the selection forcing rule. The symbols "B" and "W" that are displayed in this order indicate a feature that is deleted once due to the blacklist rules but is restored by the whitelist rules. No indication of the rule ID represents that the feature is generated while no rule is applied thereto. Providing the applied rule display region 74 enables displaying the rule applied in generating a new feature, thereby making it easy for the user to understand the generated feature.

The physical quantity display region 75 displays the unit of the feature. The unit that is obtained from the calculation operation is displayed in a manner associated with the corresponding feature. The unit of the feature that is newly generated is thus displayed, thereby making it easy for the user to understand the generated feature.

Generation of Prediction Model

The prediction model generating unit 14 shown in FIG. 2 generates, on the basis of the fixed rule and the additional rule stored in the storage unit 30, a prediction model for predicting the objective variable from the plurality of features. As described above, the plurality of features that are output in step SC6 in the flowchart shown in FIG. 8 are generated on the basis of the fixed rule and the additional rule. The prediction model generating unit 14 generates a prediction model from the plurality of features output in step SC6. The prediction model is generated, for example, by multiple regression analysis or by a decision tree. There are various generation techniques for the prediction model, and with respect to each of the generation techniques, a conventionally known method can be used.

Effects of Embodiment

As described above, in this embodiment, after analysis target data is input, the plurality of features included in the analysis target data are listed on the monitor 3 to allow the user to add meta-information to each of the listed plurality of features.

After the meta-information is added, the prediction model generating unit 14 generates, on the basis of the fixed rule and the additional rule, a prediction model for predicting the objective variable from the plurality of features. The fixed rule allows generation of a new feature from the feature alone or a combination of the plurality of features by means of a calculation operation, such as addition, subtraction, multiplication, or division. Even if the fixed rule is applicable, the additional rule determines whether to perform the calculation operation for generating a new feature in accordance with the meta-information.

That is, the meta-information that is input by the user is reflected in determination whether to generate a new feature, thereby effectively narrowing down the features to be generated, resulting in reduction in generation of features irrelevant to the objective variable. This shortens the time required to generate features as well as the time required to select the features.

Features that tend to generate less effective features are listed by the blacklist rules on the basis of the plurality of pieces of the meta-information. Thus, the feature that the blacklist rule is applicable to is not subjected to the calculation operation for generating a new feature, thereby improving the efficiency of the calculation operations based on the features.

Moreover, features that tend to generate effective features are listed by the whitelist rules on the basis of the plurality of pieces of the supplementary information. Thus, the feature that the whitelist rule is applicable to is subjected to the calculation operation for generating a new feature, thereby further effectively narrowing down the features to be generated.

Furthermore, using the selection forcing rule enables generating an effective new feature from a feature that the user considers important, for example.

The forgoing embodiment is merely an illustration in every aspect and should not be limitedly understood. Moreover, all modifications and alterations belonging to equivalents of the claims are considered to fall within the scope of the present invention.

As described above, the data analyzing device and the data analyzing method according to the present invention can be used in trying to acquire a useful unknown knowledge from a large volume of information.

What is claimed is:

1. A data analyzing device for analyzing analysis target data, comprising:
    a data input unit which receives an input of analysis target data including a plurality of features and an objective variable;
    a display unit which displays a list of the plurality of features input by the data input unit;
    a supplementary information adding unit which adds supplementary information to each of the plurality of features in the list displayed by the display unit based on an input by a user;

a rule storage unit which stores a fixed rule and an additional rule, the fixed rule specifying a rule of a calculation operation for generating a new feature from the feature alone or a combination of the plurality of features, and the additional rule specifying whether to perform a calculation operation for generating the new feature on a basis of the supplementary information added by the supplementary information adding unit, not depending on whether the fixed rule is applicable; and a prediction model generating unit which generates a prediction model for predicting the objective variable from the plurality of features, on a basis of the fixed rule and the additional rule stored in the rule storage unit.

2. The data analyzing device according to claim 1, wherein the supplementary information includes a degree of importance.

3. The data analyzing device according to claim 2, wherein the additional rule includes a rule that prevents a calculation operation of a combination of the plurality of features in which the degrees of importance of the supplementary information are less than a first predetermined value.

4. The data analyzing device according to claim 2, wherein the additional rule includes a rule that allows a calculation operation of only a combination of the feature in which the degree of importance of the supplementary information is less than the first predetermined value and the feature in which the degree of importance of the supplementary information is equal to or greater than a second predetermined value, which is higher than the first predetermined value.

5. The data analyzing device according to claim 1, wherein the supplementary information includes a system of units.

6. The data analyzing device according to claim 5, wherein the additional rule includes a rule that allows no calculation operation except for subtraction, for a combination of the features in which the systems of units of the supplementary information are time.

7. The data analyzing device according to claim 1, wherein the supplementary information includes information relating to whether the feature is controllable by the user.

8. The data analyzing device according to claim 1, wherein the additional rule includes a blacklist rule that specifies a condition for preventing a calculation operation for generating a new feature.

9. The data analyzing device according to claim 1, wherein the additional rule includes a whitelist rule that specifies a condition for allowing a calculation operation for generating a new feature.

10. The data analyzing device according to claim 8, wherein the additional rule includes the whitelist rule that specifies a condition for allowing a calculation operation for generating a new feature, and the blacklist rule is applied before the whitelist rule is applied.

11. The data analyzing device according to claim 9, wherein the additional rule includes a blacklist rule that specifies a condition for preventing a calculation operation for generating a new feature, and the whitelist rule is applied before the blacklist rule is applied.

12. The data analyzing device according to claim 1, wherein the additional rule includes a selection forcing rule that specifies a condition for making the feature remain as a new feature at any time.

13. The data analyzing device according to claim 1, which is configured to allow a user to add a type of the supplementary information.

14. A data analyzing method for analyzing analysis target data, comprising:

receiving an input of analysis target data including a plurality of features and an objective variable;

displaying a list of the plurality of features input;

allowing a user to input and add supplementary information to each of the plurality of features in the displayed list;

storing a fixed rule and an additional rule, the fixed rule specifying a rule of a calculation operation for generating a new feature from the feature alone or a combination of the plurality of features, and the additional rule specifying whether to perform a calculation operation for generating the new feature on a basis of the supplementary information capable of being added by the supplementary information adding unit, not depending on whether the fixed rule is applicable; and generating a prediction model for predicting the objective variable from the plurality of features, on a basis of the fixed rule and the additional rule that are stored.

* * * * *